(12) United States Patent
Eikkula

(10) Patent No.: US 8,493,997 B2
(45) Date of Patent: *Jul. 23, 2013

(54) PROVIDING A NETWORK NODE WITH SERVICE REFERENCE INFORMATION

(75) Inventor: Jari Eikkula, Espoo (FI)

(73) Assignee: Nokia Corporation, Espoo (FI)

( * ) Notice: Subject to any disclaimer, the term of this patent is extended or adjusted under 35 U.S.C. 154(b) by 924 days.

This patent is subject to a terminal disclaimer.

(21) Appl. No.: 12/264,430

(22) Filed: Nov. 4, 2008

(65) Prior Publication Data

US 2009/0059904 A1    Mar. 5, 2009

Related U.S. Application Data

(63) Continuation of application No. 09/835,821, filed on Apr. 17, 2001, now Pat. No. 7,512,151.

(51) Int. Cl.
*H04J 3/22* (2006.01)

(52) U.S. Cl.
USPC ............................. 370/467; 370/466; 370/465

(58) Field of Classification Search
USPC ................ 370/254, 255, 270, 433, 443, 455, 370/464, 465, 466, 467; 709/212, 217, 223; 379/111, 112.01
See application file for complete search history.

(56) References Cited

U.S. PATENT DOCUMENTS

| 6,724,748 B1 * | 4/2004 | Stille et al. ................... 370/352 |
| 6,735,621 B1 * | 5/2004 | Yoakum et al. ............... 709/218 |
| 6,868,090 B1 | 3/2005 | Ma et al. |
| 6,961,332 B1 | 11/2005 | Li et al. |
| 7,043,246 B2 | 5/2006 | Uskela |
| 7,058,068 B2 * | 6/2006 | Gawargy et al. .............. 370/410 |
| 7,136,373 B2 | 11/2006 | Ma |
| 7,180,984 B1 * | 2/2007 | Samarasinghe ............ 379/88.13 |
| 7,243,162 B2 | 7/2007 | O'Neill et al. |
| 7,254,643 B1 * | 8/2007 | Peters et al. .................. 709/246 |
| 7,277,421 B1 | 10/2007 | Pershan |
| 7,333,505 B2 | 2/2008 | Yoakum et al. |
| 7,463,615 B2 * | 12/2008 | Vassilovski et al. .......... 370/342 |
| 7,664,495 B1 * | 2/2010 | Bonner et al. ................ 455/433 |
| 7,715,413 B2 * | 5/2010 | Vaziri et al. .................... 370/401 |
| 7,787,858 B2 * | 8/2010 | Koskinen et al. ............. 455/405 |
| 7,881,251 B2 * | 2/2011 | Hovey ........................... 370/328 |
| 8,126,124 B2 * | 2/2012 | Cai ............................. 379/114.1 |

(Continued)

FOREIGN PATENT DOCUMENTS

| WO | 9960801 A1 | 11/1999 |
| WO | 0042760 A1 | 7/2000 |

(Continued)

OTHER PUBLICATIONS

M.D. Cookson et al., "3G service control," BT Technol J., vol. 19, No. 1, Jan. 2001, pp. 67-79.

(Continued)

*Primary Examiner* — Hassan Phillips
*Assistant Examiner* — Mark A Mais
(74) *Attorney, Agent, or Firm* — Harrington & Smith

(57) ABSTRACT

Service reference information is added to an IP telephony signaling protocol message and the IP telephony signaling protocol message is then sent to the network node in order to provide a network node using the IP telephony signaling protocol, e.g., SIP, with service reference information needed for billing purposes.

27 Claims, 1 Drawing Sheet

U.S. PATENT DOCUMENTS

| | | | |
|---|---|---|---|
| 8,139,559 B2 * | 3/2012 | Koskinen et al. | 370/352 |
| 8,315,593 B2 * | 11/2012 | Gallant et al. | 455/406 |
| 2003/0165222 A1 * | 9/2003 | Syrjala et al. | 379/114.26 |
| 2004/0078349 A1 * | 4/2004 | Syrjala et al. | 705/412 |
| 2007/0217436 A1 * | 9/2007 | Markley et al. | 370/401 |
| 2009/0248794 A1 * | 10/2009 | Helms et al. | 709/203 |
| 2011/0116419 A1 * | 5/2011 | Cholas et al. | 370/259 |

FOREIGN PATENT DOCUMENTS

| | | | |
|---|---|---|---|
| WO | 0079756 A2 | 12/2000 | |
| WO | 0137523 A1 | 5/2001 | |
| WO | 0186968 A1 | 11/2001 | |
| WO | 0191445 A1 | 11/2001 | |

OTHER PUBLICATIONS

M.L.F. Grech, "Providing Seamless Services for VOIP Mobile Data Networks Using CAMEL/IN Concepts," 3G Mobile Communication Technologies, Conference Publication No. 471, IEE 2000, pp. 133-137.

* cited by examiner

PROVIDING A NETWORK NODE WITH SERVICE REFERENCE INFORMATION

CROSS-REFERENCE TO RELATED APPLICATIONS

This application is a continuation of U.S. patent application Ser. No. 09/835,821, filed Apr. 17, 2001 and issued as U.S. Pat. No. 7,512,151 B2 on Mar. 31, 2009, the entire contents of which are incorporated herein by reference.

BACKGROUND

This disclosure relates to relaying service reference information with an IP (Internet Protocol-based) telephony signaling protocol used in IP-based networks. One example of service reference information is CAMEL-related information. CAMEL (Customized Applications for Mobile network Enhanced Logic) is an intelligent network-based solution standardized by ETSI (European Telecommunications Standards Institute) as one of the GSM (Global System for Mobile communications) phase 2+ services. One example of an IP telephony signaling protocol is SIP (Session Initiation Protocol) which is developed by IETF (Internet Engineering Task Force).

Transferring data associated with various time-critical applications in IP-based networks has been an attractive topic in recent years. It has also been one of the main goals in the development of the mobile communications systems, and especially in so-called third generation mobile communications systems, such as UMTS (Universal Mobile Communications System). A mobile communications system refers generally to any telecommunications system which enables wireless communication when users are moving within the service area of the system. A typical mobile communications system is a Public Land Mobile Network (PLMN).

One UMTS system based on IP technology is the so-called 3GPP AII-IP system, which is defined in the 3rd generation partnership project 3GPP. One standard used for IP telephony implementation in 3GPP All-IP is SIP. SIP is an application-level control protocol which allows the establishment, alteration and interruption of multimedia connections and voice over IP connections. IP telephony is a general term covering services from standard voice telephony utilizing an IP protocol (VoIP, Voice over IP) to multimedia applications using IP data, voice and video.

In the 3GGP All-IP system, the intelligent network service implementation may be based on the CAMEL architecture. One of the problems to be solved when implementing CAMEL to the network using SIP, is how to transfer at least mandatory CAMEL-related information used for charging purposes between network nodes/functions using SIP. In the GSM system CAMEL-related information is obtained by sending a routing number request. However, in SIP such mechanism does not exists.

One solution to the above problem is to provide SIP with a routing number request mechanism corresponding to the one used in GSM to transfer CAMEL-related information. A problem with this kind of a solution is that it would require new messages in SIP.

SUMMARY

One or more embodiments of this disclosure provide a method and an apparatus for implementing the method so as to solve the above problem.

This disclosure is based on realizing the problem and solving it by the idea of modifying an existing IP telephony signaling protocol message, such as a SIP INVITE message or a message acknowledging it, so that the service reference information, such as CAMEL-related information, is transmitted in the IP telephony signaling protocol message. An advantage of this approach is that by modifying an existing IP telephony signaling protocol message service reference information will be transmitted without any new messages.

BRIEF DESCRIPTION OF THE DRAWINGS

Various aspects of this disclosure will be described in greater detail by means of various embodiments with reference to the accompanying drawings, in which.

DETAILED DESCRIPTION

Embodiments of this disclosure can be applied to any communications system where service reference is to be transferred between network nodes using an IP telephony signaling protocol. Such systems include 'the third generation mobile communications systems', such as UMTS, the corresponding mobile communications systems and combination systems utilizing mobile user equipment and a fixed IP-based network. The service reference information may be CAMEL-related information, OSA-related (Open Service Architecture) information or Parlay API-related (Application Protocol Interface) information, for example. Examples of IP telephony signaling protocols are H.323, SIP and a SIP evaluation called SIP+. Aspects of this disclosure will be described by using the 3GPP AII-IP system utilizing CAMEL and SIP as an example without restricting the claims thereto. The specifications of mobile communications systems, and the third generation mobile communications systems in particular, progress quickly. This may make additional changes to aspects of this disclosure desirable. Therefore, all words and expressions should be interpreted broadly and they are intended for illustrating, and not restricting the inventive concept.

Figure 1:
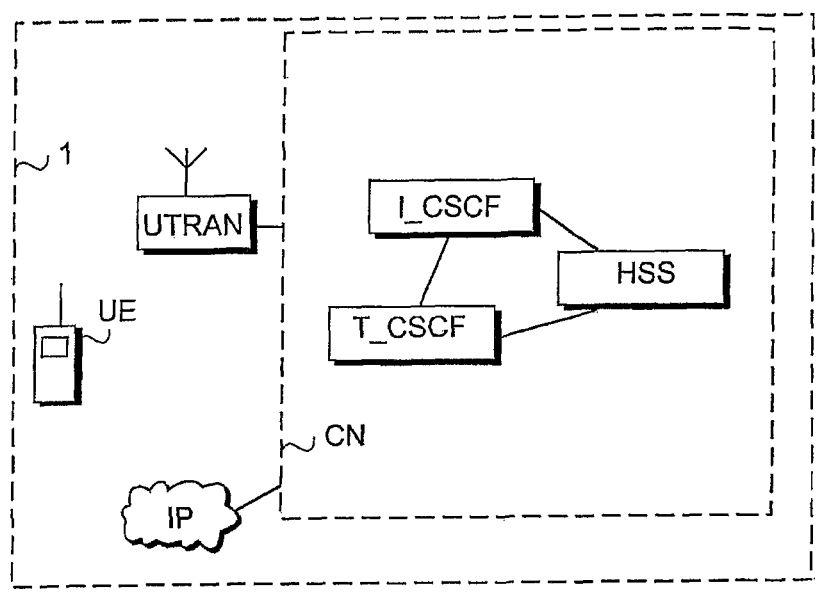
FIG. 1 is a block diagram illustrating a simplified network architecture.

FIG. 1 shows a simplified network architecture and illustrates only those elements of the communications system 1 relating to a called subscriber B that are essential for understanding aspects of this disclosure. Network nodes shown in FIG. 1 are logical units the implementation of which may differ from what is described here. It is obvious to a person skilled in the art that the system 1 also comprises other functions and structures, which need not be described in greater detail here.

In the 3GPP AII-IP system 1, a difference is made between an access layer and a telephony layer, which may both have their own operators. Usually the access layer provides the user with a wireless access to external networks, such as IP networks (Internet Protocol), and the services thereof, such as Internet telephony (IPT, IP Telephony), such that the telephony layer is responsible for control. The IP telephony is in practice invisible to network nodes of the access layer, and they do not participate in the routing of the IP telephony. However, there are signaling connections from each level to various service platforms, such as a CAMEL Service Environment (CSE), billing centers and an IP telephony application server. The different layers and service platforms are not shown in FIG. 1.

In the example of FIG. 1, the system 1 comprises a core network CN and a UMTS terrestrial radio access network UTRAN. The UTRAN is formed of a group of radio network subsystems (not shown in FIG. 1) which are connected to the core network CN. A radio network subsystem can be based on the GPRS (General Packet Radio Service) of the GSM system, for example. The core network CN can be connected to external networks, such as IP networks IP. In the example of FIG. 1, the core network comprises a home subscriber server HSS, an interrogative call state control function I_CSCF and a serving call state control function T_CSCF, which serves the subscriber B registered in the network. The HSS and the I_CSCF locate in the home network of the subscriber B whereas T_CSCF is either in the home network or in a visited network.

The serving call state control function T_CSCF is a network node in which IP telephony user equipment, and thus subscribers, are registered and via which the signaling associated with the IP telephony, such as SIP, is transferred. The T_CSCF participates in controlling a call made by the user equipment and in supporting the establishment of calls terminating at the user equipment registered in the network, as well as in supporting the triggering of the services associated with these calls when the triggering conditions are fulfilled. In other words, the T_CSCF controls call establishment and contains, among other things, a function corresponding to an intelligent network service switching function and the call state models of the IP telephony, by which the call establishment is controlled together with other network nodes, such as a service control point, the CSE and IP telephony application servers (these are not shown in FIG. 1). The T_CSCF is the network node through which the signaling of a mobile-terminating call is transferred from the actual IP network IP, for instance. The T_CSCF usually contains a subscriber database which logically corresponds to the visitor location register of the GSM system. The T_CSCF is also responsible for producing billing information. The serving call state function may also be called a terminating call state control function, an originating call state control function or a visited call state control function. The serving call state control function corresponds to the visited mobile switching center of the GSM system. The T_CSCF operation according to one or more embodiments is explained in greater detail in connection with FIG. 2.

The interrogative call state control function I_CSCF participates in controlling the establishment of a call made to a subscriber, and it determines how the mobile-terminating call is to be routed. In other words, it is authorized to route calls terminating at user equipment. Thus, the I_CSCF functions as an entry point for a mobile-terminating call to the subscriber B and corresponds to a gateway mobile switching center (GMSC) of the GSM system. The I_CSCF interrogates the subscriber B's HSS in order to detect routing information and routes the call on the basis of the address obtained from the HSS. The I_CSCF may also produce billing information relating to the subscriber B. The I_CSCF operation according to one or more embodiments is explained in greater detail in connection with FIG. 2.

The functionality of various call state control functions, I_CSCF and T_CSCF, is not affected by the type of the access network. This means that the access network may be a wireless network, as in the example of FIG. 1, or a wired network.

The home subscriber server HSS logically corresponds to the home location register of the GSM system, and subscriber data for each subscriber of the home network are stored therein either permanently or semi-permanently such that the subscriber data are combined with a subscriber identifier, which in the GSM system, for example, is IMSI (International Mobile Subscriber Identity). When a subscriber registers into the network, the HSS transmits the subscriber's service information, which may comprise CAMEL subscriber information CSI, to the serving call state control function T_CSCF. When there is no address of a serving call state control function for a subscriber, the HSS transmits the subscriber's service information as a routing instruction to the I_CSCF.

Subscriber B's user equipment UE comprises the actual terminal and a detachably connected identification card USIM, also called a subscriber identity module. In this context, the user equipment UE generally means the entity formed by the subscriber identity module and the actual terminal. The actual terminal can be any equipment or a combination of various devices capable of communicating in a mobile communications system.

In addition to prior art means, the network nodes comprise means for implementing the functionality described below. The current network nodes comprise processors and memory, which can be utilized in the functions according to embodiments of this disclosure. All changes necessary for implementing various embodiments can be made as added or updated software routines, by means of application-specific integrated circuits (ASIC) and/or programmable circuits, such as EPLD, FPGA.

The mandatory CAMEL-related information for billing includes a CAMEL call reference number generated in the GSM network by the GMSC and the address of the GMSC (which corresponds to the I_CSCF). The mandatory CAMEL-related information is needed when billing information of the called subscriber B is collected and Charging Data Records (CDRs) are generated in the T_CSCF and/or I_CSCF. The mandatory CAMEL-related information is added to each CDR and on the basis of the information the CDRs relating to a call are combined in the charging center. The same mandatory CAMEL related information is needed also, when a CAMEL-based service is triggered in the T_CSCF and/or I_CSCF. In future some other CAMEL-related information may be needed. A network node may comprise a definition or definitions indicating which CAMEL-related information should be added, generated, used and/or in which context the CAMEL-related information should be used.

Figure 2:
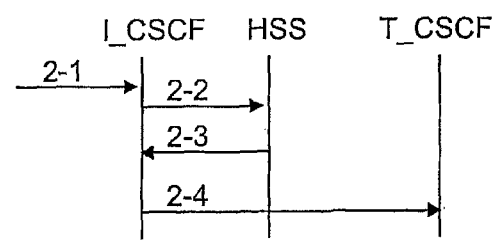
FIG. 2 illustrates signaling according to an embodiment.

FIG. 2 illustrates signaling according to one or more embodiments. In the example of FIG. 2 it is assumed for clarity's sake that the called one, i.e. subscriber B, is registered in the T_CSCF and that the mandatory CAMEL-related information for billing is added and generated in the I_CSCF.

When the subscriber A makes a call to the subscriber B, the O_CSCF sends a SIP INVITE message 2-1 to the I_CSCF of the subscriber B. The SIP INVITE message is an example of an IP telephony signaling protocol initiating a session. The I_CSCF is found on the basis of a host-part of the logical IP address, i.e. IP address in the form a@x.y where the host-part is after the @-sign. If the address of the subscriber B is B@try.com, the logical address of the I_CSCF of the subscriber B is icscf.try.com.

Upon reception of message 2-1, the I_CSCF requests from the HSS a routing address for the subscriber B in message 2-2. The HSS sends at least the routing address, i.e. the address of the T_CSCF, to the I_CSCF in message 2-3. The I_CSCF of an embodiment then generates a CAMEL call reference number and codes it with its own address to a digit string and adds the digit string to an INVITE message. After that the I_CSCF sends the INVITE message 2-4 to the T_CSCF, stores the CAMEL-related information and uses it when generating CDRs, for example.

When the T_CSCF of an embodiment receives message 2-4, it separates the CAMEL-related information from message 2-4, decodes it to obtain the CAMEL call reference number and the address of the I_CSCF, stores them and uses them when generating CDRs or triggering a CAMEL-related service, for example. Thus, both the I_CSCF and the T_CSCF have the same CAMEL-related information used in CDRs.

The I_CSCF is preferably arranged always to add to the INVITE message 2-4 CAMEL-related information, i.e. its address and the CAMEL call reference number, as a coded digit string or as such. The advantage of this is that the I_CSCF does not need information on the status of the terminating CAMEL subscription information, i.e. it does not need to know whether the address and the CAMEL call reference number is needed. However, the I_CSCF may be arranged not to add the CAMEL-related information to each INVITE message.

In a first preferred embodiment of an embodiment the I_CSCF adds the CAMEL-related information to the SIP header of the INVITE message as one of the subheaders.

The following SIP INVITE message header is one example of a SIP INVITE message header according to the first preferred embodiment of an embodiment, which could be forwarded from the I_CSCF to the T_CSCF. The header comprises 9 subheaders in this example. The IP addresses are logical IP addresses for clarity's sake. The eighth subheader (starting by word CAMEL) includes CAMEL-related information, i.e. the address of the I_CSCF and the CAMEL call reference number generated by the I_CSCF, coded in a digit string the T_CSCF understands. The T_CSCF then decodes the digit string. In other embodiments, each piece of CAMEL-related information may be given in separate subheaders or in one subheader in a predetermined order so that information is separated by a comma, for example. It is also possible to code only part of CAMEL-related information and send the other part of the CAMEL-related information uncoded.

INVITE sip:ue_b@home_b.com SIP/2.0
    Via: SIP/2.0/UDP icscf.home_b.com
    From: User_A<sip:ue_a@home_a.com>
    To: User_B<sip:ue_b@home_b.com>
    Call-ID: a@ue_a.home_a.com
    Cseq: 1 INVITE
    Content-Length: 829
    CAMEL: 23446321247984349
    Encryption: PGP version=2.6.2, encoding=ascii
    Message body In a another embodiment, the I_CSCF adds the CAMEL-related information to the body of the SIP INVITE message. In the following example of a SIP INVITE message according to this embodiment, only the CAMEL-related information, coded to a digit string, is shown. In other embodiments, each piece of CAMEL-related information may be given in separate message body rows or in one row in a predetermined order so that different information is separated by a comma, for example.

INVITE sip:ue_b@home_b.com SIP/2.0
    Via: SIP/2.0/UDP icscf.home_b.com
    From: User_A<sip:ue_a@home_a.com>
    To: User_B<sip:ue_b@home_b.com>
    Call-ID: a@ue_a.home_a.com
    Cseq: 1 INVITE
    Content-Length: 829
    Encryption: PGP version=2.6.2, encoding=ascii
    Message body starts . . .
    CAMEL: 23446321247984349
    . . . Message body ends Although embodiments have been described above with the CAMEL call reference number and the address of the I_CSCF, it is obvious to a person skilled in the art that other corresponding information needed in a call state control function for CAMEL services may also be transmitted in the SIP INVITE message from the I_CSCF to the T_CSCF and generated in the I_CSCF, if needed.

Although embodiments have been described above assuming that the I_CSCF generates the CAMEL call reference number (and corresponding information), it is obvious to a person skilled in the art that some other network node, such as the HSS, may also generate the needed information and send it to the I_CSCF, which then just adds this information to the SIP INVITE message.

Although embodiments of this disclosure have been described above assuming that the CAMEL-related information is added in the I_CSCF, it is obvious to a person skilled in the art that CAMEL-related invention may also be added to a SIP INVITE message by the caller's serving call state control function O_CSCF. In this embodiment the I_CSCF may pass the CAMEL-related information to the T_CSCF as such, modify the information or add some further information before relaying the information in the SIP INVITE message to the T_CSCF, or pass no CAMEL-related information it received in the SIP INVITE message to the T_CSCF. For example, the I_CSCF may receive the CAMEL call reference number from the O_CSCF in the SIP INVITE message and add only the address of the I_CSCF to the SIP INVITE message before sending it to the T_CSCF.

Although various embodiments have been described above assuming that the CAMEL-related information is transmitted in a SIP INVITE message, it is obvious to a person skilled in the art that CAMEL-related information may be added to a response message acknowledging the SIP INVITE message or a corresponding message invoking a session. The response message can be a final response, such as '200 OK' or a provisional response, such as '100 Trying' or '183 Session progress'. In this embodiment the CAMEL-related information is added in a network node sending the SIP response message, such as the call state control function serving the terminating subscriber T_CSCF. It is even possible to utilize both messages to transmit CAMEL-related information. For example, the I_CSCF may add its address to the SIP INVITE message and the T_CSCF may generate the CAMEL call reference number and add it to the response message acknowledging the SIP INVITE message.

Although embodiments have been described above assuming that the address of the I_CSCF is used instead of the address of the GMSC as mandatory CAMEL-related information, it is obvious to a person skilled in the art that the address of another network node, such as the T_CSCF or O_CSCF, may also be used instead of the address of the GMSC.

It will be obvious to a person skilled in the art that, as the technology advances, the inventive concept can be implemented in various ways. This disclosure and its various embodiments are not limited to the examples described above, but may vary within the scope of the claims.

What is claimed is:

1. A method, comprising:
    receiving an internet protocol-based telephony signaling protocol message;
    generating a customized applications for mobile network enhanced logic call reference number for a call;
    adding, by a processor, at least the customized applications for mobile network enhanced logic call reference number as non-internet protocol-based telephony signaling protocol service reference information to the internet protocol-based telephony signaling protocol message; and sending the modified internet protocol-based telephony signaling protocol message to a network node, wherein said service reference information comprises customized applications for mobile network enhanced logic-related information.

2. A method according to claim 1, wherein said internet protocol-based telephony signaling protocol message is a message initiating a session.

3. A method according to claim 1, the method further comprising:

routing the call to the network node via an entry point; and performing said adding in the entry point.

4. A method according to claim 3, wherein at least an address of the entry point is added as service reference information to the internet protocol-based telephony signaling protocol message.

5. A method according to claim 1, further comprising routing the call to the network node via an entry point, where adding at least the customized applications for mobile network enhanced logic call reference number as said service reference information to the internet protocol-based telephony signaling protocol message is performed in the entry point.

6. A method according to claim 1, further comprising:

routing the call to the network node via an entry point; and coding the customized applications for mobile network enhanced logic call reference number and the address of the entry point to a digit string, where adding at least the customized applications for mobile network enhanced logic call reference number as non-internet protocol-based telephony signaling protocol service reference information to the internet protocol-based telephony signaling protocol message comprises adding at least the digit string as the non-internet protocol-based telephony signaling protocol service reference information to the internet protocol-based telephony signaling protocol message in the entry point.

7. A method according to claim 1, wherein said internet protocol-based telephony signaling protocol message is a response message acknowledging a message invoking a session.

8. A method according to claim 7, the method further comprising:

adding at least an address of a network node serving a called subscriber as service reference information to the response message.

9. A method according to claim 1, wherein said internet protocol-based telephony signaling protocol message is a response message acknowledging a message invoking a session.

10. A method according to claim 1, wherein said internet protocol-based telephony signaling protocol message is a response message acknowledging a message invoking a session, the method further comprising coding the customized applications for mobile network enhanced logic call reference number and an address of a network node serving a called subscriber to a digit string, where adding at least the customized applications for mobile network enhanced logic call reference number as non-internet protocol-based telephony signaling protocol service reference information to the internet protocol-based telephony signaling protocol message comprises adding at least the digit string as the non-internet protocol-based telephony signaling protocol as service reference information to the response message.

11. A method according to claim 1, wherein said internet protocol-based telephony signaling protocol comprises a session initiation protocol.

12. A method according to claim 1, wherein said internet protocol-based telephony signaling protocol comprises H.323.

13. A method according to claim 11, wherein adding comprises adding the customized applications for mobile network enhanced logic-related information to the header of the internet protocol-based telephony signaling protocol message.

14. A method according to claim 11, wherein adding comprises adding the customized applications for mobile network enhanced logic-related information to the body of the session initiation protocol message.

15. A method as claimed in claim 1, wherein the non-internet protocol-based telephony signaling protocol service reference information comprises a charging identifier generated to be used in billing as charging correlation information.

16. An apparatus, comprising at least one processor; and at least one memory including computer program code, the at least one memory and the computer program code configured to, with the at least one processor, cause the apparatus to perform at least the following:

to receive an internet protocol-based telephony signaling protocol message;

to generate a customized applications for mobile network enhanced logic call reference number for a call;

to add at least the customized applications for mobile network enhanced logic call reference number as non-internet protocol-based telephony signaling protocol service reference information to the internet protocol-based telephony signaling protocol message; and to send the modified internet protocol-based telephony signaling protocol message to a network node, wherein said service reference information comprises customized applications for mobile network enhanced logic-related information.

17. The apparatus according to claim 16, wherein said internet protocol-based telephony signaling protocol message is a message initiating a session.

18. The apparatus according to claim 16, wherein said internet protocol-based telephony signaling protocol message is a response message acknowledging a message invoking a session.

19. The apparatus according to claim 16, where adding the non-internet protocol-based telephony signaling protocol service reference information to the internet protocol-based telephony signaling protocol message comprises adding the non-internet protocol-based telephony signaling protocol service reference information to the header of the internet protocol-based telephony signaling protocol message.

20. The apparatus according to claim 16, wherein said internet protocol-based telephony signaling protocol comprises a session initiation protocol and where adding comprises adding the non-internet protocol-based telephony signaling protocol service reference information to the body of the session initiation protocol message.

21. The apparatus according to claim 16, wherein the non-internet protocol-based telephony signaling protocol service reference information comprises a charging identifier generated to be used in billing as charging correlation information.

22. A non-transitory computer readable medium tangibly encoded with a computer program executable by a processor to perform actions comprising:

receiving an internet protocol-based telephony signaling protocol message;

generating a customized applications for mobile network enhanced logic call reference number for a call;

adding at least the customized applications for mobile network enhanced logic call reference number as non-internet protocol-based telephony signaling protocol service reference information to the internet protocol-based telephony signaling protocol message; and sending the modified internet protocol-based telephony signaling protocol message to a network node, wherein said service reference information comprises customized applications for mobile network enhanced logic-related information.

23. The computer readable medium according to claim 22, wherein said internet protocol-based telephony signaling protocol message is a message initiating a session.

24. The computer readable medium according to claim 22, wherein said internet protocol-based telephony signaling protocol message is a response message acknowledging a message invoking a session.

25. The computer readable medium according to claim 22, wherein adding comprises adding the non-internet protocol-based telephony signaling protocol service reference information to the header of the internet protocol-based telephony signaling protocol message.

26. The computer readable medium according to claim 22, wherein said internet protocol-based telephony signaling protocol comprises a session initiation protocol and where adding comprises adding the non-internet protocol-based telephony signaling protocol service reference information to the body of the session initiation protocol message.

27. The computer readable medium according to claim 22, wherein the non-internet protocol-based telephony signaling protocol service reference information comprises a charging identifier generated to be used in billing as charging correlation information.

* * * * *